(12) United States Patent
Sallinen et al.

(10) Patent No.: US 6,807,417 B2
(45) Date of Patent: Oct. 19, 2004

(54) METHOD AND NETWORK ELEMENT FOR ESTABLISHING A CONNECTION TO A LOCAL SERVICE

(75) Inventors: Timo Sallinen, Halikko (FI); Kaarina Suninen, Helsinki (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/045,638

(22) Filed: Jan. 9, 2002

(65) Prior Publication Data

US 2002/0107012 A1 Aug. 8, 2002

Related U.S. Application Data

(63) Continuation of application No. PCT/EP99/05064, filed on Jul. 15, 1999.

(51) Int. Cl.[7] .............................. H04Q 7/20; H04M 1/00
(52) U.S. Cl. ..................................... 455/432.1; 455/560
(58) Field of Search ................................ 455/432, 426, 455/565, 560, 432.1; 370/329

(56) References Cited

U.S. PATENT DOCUMENTS

| | | | |
|---|---|---|---|
| 5,353,340 A | * 10/1994 | Kunz | ..................... 455/432.1 |
| 5,533,107 A | 7/1996 | Irwin et al. | |
| 5,768,267 A | * 6/1998 | Raith et al. | ................. 370/329 |
| 5,870,673 A | * 2/1999 | Haartsen | ..................... 455/426 |
| 5,872,513 A | 2/1999 | Fitzgibbon et al. | |
| 5,953,400 A | 9/1999 | Rosenthal et al. | |
| 6,256,515 B1 | * 7/2001 | Cox et al. | ..................... 455/565 |
| 6,622,027 B1 | * 9/2003 | Menzel et al. | .............. 455/560 |

FOREIGN PATENT DOCUMENTS

| | | |
|---|---|---|
| DE | 3130408 | 2/1983 |
| FR | 2762746 | 10/1998 |
| GB | 2285365 | 7/1995 |
| WO | 9411967 | 5/1994 |
| WO | WO 98/43448 | * 10/1998 |

* cited by examiner

*Primary Examiner*—William Cumming

(57) ABSTRACT

The present invention relates to a method and network element for establishing a connection to a local service, wherein a local cellular network having a limited coverage is provided, which may be temporarily accessed based on visitor access requirement. A call attempt is analyzed with respect to the visitor access requirement and the connection to the local service is established if the received call attempt meets the visitor access requirement. Thus, a temporary access can be enabled without a subscription to the supplementary service of the local cellular network. Thereby, any visitor having a mobile telephone may access the local service.

18 Claims, 3 Drawing Sheets

METHOD AND NETWORK ELEMENT FOR ESTABLISHING A CONNECTION TO A LOCAL SERVICE

CROSS-REFERENCE TO RELATED APPLICATION

This application is a continuation of International Application PCT/EP99/05064 having an international filing date of Jul. 15, 1999 and from which priority is claimed under all applicable sections of Title 35 of the United States Code including, but not limited to, Sections 120, 363 and 365(c).

FIELD OF THE INVENTION

The present invention relates to a method and network element for establishing a connection to a local service in a cellular network, such as a GSM (Global System for Mobile Telecommunications) or UMTS (Universal Mobile Telecommunications System) network.

BACKGROUND OF THE INVENTION

In Public Land Mobile Networks (PLMNs), supplementary services enable subscribers, connected to the PLMN and possibly also to other networks, to form closed groups to and from which access is restricted. Such closed group services are CUG (Closed User Groups), WIO (Wireless Intranet Offices), LAN (Local Area Networks) or WLAN (Wireless Local Area Network). A specific user may be a member of one or more of such closed group supplementary services. Members of a specific closed group supplementary service can communicate among each other but not, in general, with users outside the group. The closed group supplementary service is provided after a prior arrangement with the service provider. At provision, subscription options can be selected by the served mobile subscriber.

In public places, such as large outdoor happenings (rock concert, sports event, etc.) or amusement parks, visitors often like to get in touch with the organizing personnel in order to get information or assistance. However, usually visitors do not know whom to contact and where to look for a contact person.

Nowadays, people often carry mobile telephones which could be easily used for such contact purposes. However, a contact number does not exist. The allocation of a temporary number in the PLMN for this purpose would be expensive and meaningless for the organizer of the event. Moreover, the temporary number would cover the whole PLMN and not only a restricted area.

Furthermore, the establishment of a closed group service would require a prior subscription of a visitor so as to be allowed to contact the closed group.

SUMMARY OF THE INVENTION

It is therefore an object of the present invention to provide a method and network element for establishing a connection to a local service, by means of which an access to the local service is possible by any mobile telephone.

This object is achieved by a method for establishing a connection to a local service, comprising the steps of:
providing a local area having a limited coverage;
defining a visitor access requirement based on at least one visitor criterion for a temporary access to said local area;
analyzing a received connection attempt with respect to the visitor access requirement; and
establishing the connection if the received connection attempt meets the visitor access requirement.

Furthermore, the above object is achieved by a network element for establishing a connection to a local service, comprising:
receiving means for receiving a connection attempt from a terminal;
storing means for storing at least one visitor criterion determining a visitor access requirement for a temporary access to a local area providing the local service;
analyzing means for analyzing the received connection attempt with respect to the visitor access requirement; and
control means for performing a control so as to initiate a call establishment if the received connection attempt meets the visitor access requirement.

Accordingly, a location-based subscription to a closed group supplementary service can be provided, wherein a subscriber or a group of subscribers in a specific area is given a temporary visiting access to the closed local cellular network. The local area may be a local cellular network, one or a plurality of predetermined cells of a cellular network, or the like, and is mainly used for internal communication of an organizer or service personnel, but a visitor access can be allocated to "outsiders".

Preferably, the at least one visitor criterion comprises a visitor dialling number, a predetermined location of a terminal generating the received connection attempt, the time of the received connection attempt, and/or an identity of the terminal generating the received connection attempt, or a combination of these. Thus, a temporary access can be realized e.g. by allocating certain telephone numbers within the network for "visitor connections". These visitor telephone numbers may be indicated in the service area, such that any visitor carrying a mobile telephone may contact the organizing or service personnel. Preferably, at least one predetermined visitor number is allocated for visitor connections within the local area. In this case, the analyzation step comprises comparing a dialled number of the received connection attempt with the at least one predetermined visitor number. The at least one predetermined visitor number may be released for further use after the connection has been completed. Alternatively, a plurality of parallel connections may be established when a plurality of connection attempts meeting the visitor access requirement have been received.

The number of services provided to the established visitor connection may be limited. Thereby, a subset of all possible services for a visitor can be decided by the operator or service provider. Moreover, a network charging rate may be determined based on a subscriber information derived from the connection attempt and/or a service requested by the connection attempt. Thus, a cheap or even free service can be provided to good customers, and special services may be priced at a higher rate.

The "visitor call" can be routed to a preferred destination, e.g. to a nearest info desk or service person.

The routing of the call can be determined based on a subscriber information (e.g. location) derived from the connection attempt and/or other information (e.g. time of the day) relating to the call.

Preferably, the local service may be an information or location service, a wireless private branch exchange service, an online voting, polling or gambling service, or a visitor LAN service.

The analyzing means of the network element may comprise an extracting means for extracting an information relating to the at least one visitor criterion from the received connection attempt, and a comparing means for comparing the extracted information with the at least one visitor criterion stored in the storing means, wherein the control means performs the control in response to the comparison result of the comparison means.

Preferably, the network element may be a visitor location register serving the local area.

Furthermore, a user interface of the terminal may comprise a voice connection and/or a video connection to an information desk, an interactive graphical menu or an interactive map, or any combination of these, e.g. the menu could be downloaded from an MeXE (Mobile Station Application Execution Environment) server or WAP (Wireless Application Protocol) based solutions could be used. Thus, a flexible local visitor access to a predetermined set of services can be provided.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENTS

In the following, the preferred embodiment of the present invention will be described on the basis of a PLMN, e.g. a GSM or UMTS network.

Figure 1:
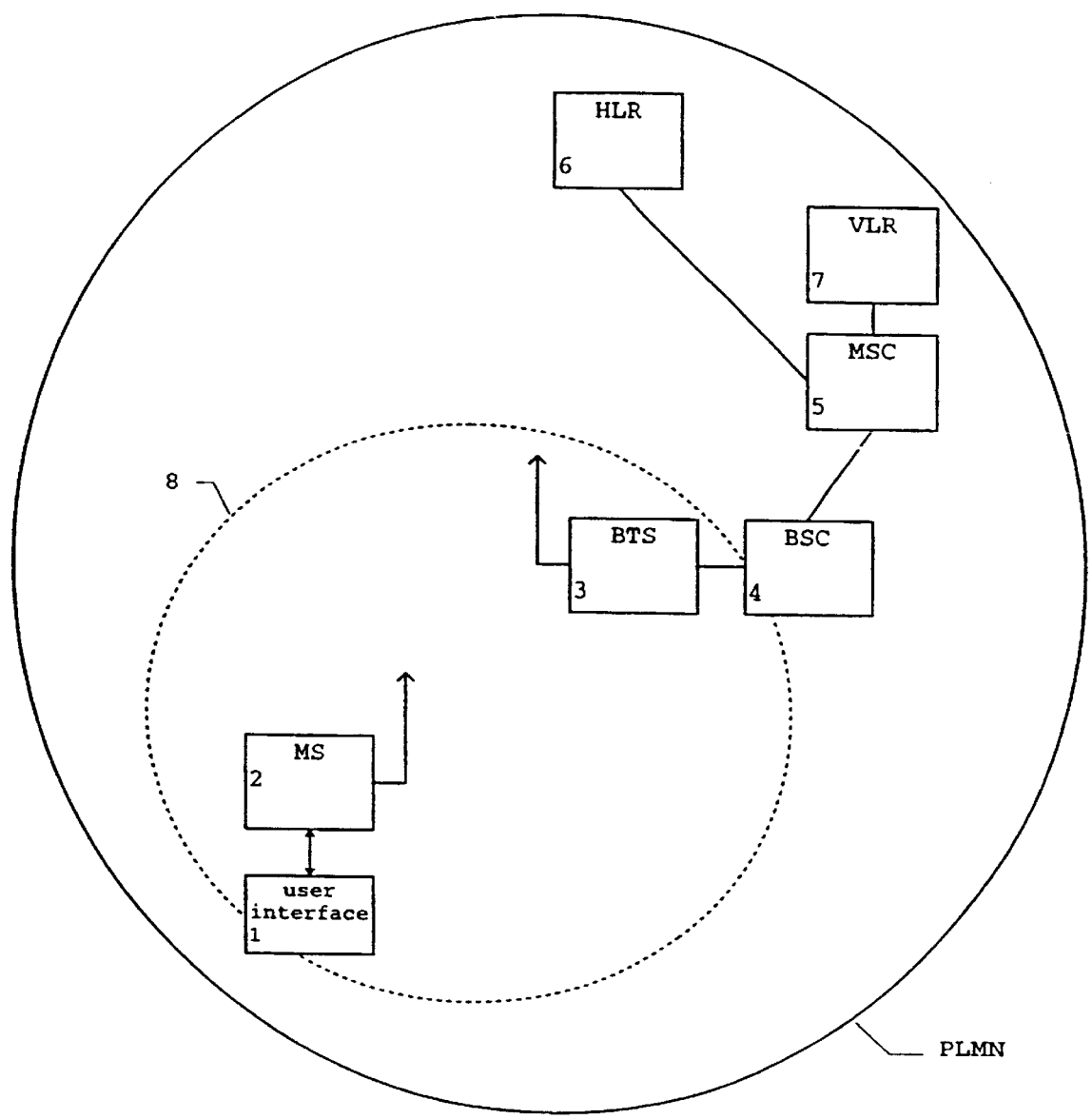
FIG. 1 shows a block diagram of a mobile communication network comprising a local area with limited coverage, in which the present invention can be applied.

FIG. 1 shows a block diagram comprising those components of a PLMN network, which are essential to the present invention. According to FIG. 1, the PLMN comprises a local area local cellular network 8, such as a CUG, WIO, LAN or WLAN. The local cellular network 8 has a limited coverage and is served by the PLMN via a Base Transceiver Station (BTS) 3 and a Base Station Controller (BSC) 4, which form a Base Station System (BSS). The BSC 4 is connected to a Mobile Switching Center (MSC) which is an exchange and which performs all switching functions for mobile stations (MSs) located in a geographical area designated as the MSC area. The MSC 5 takes into account the impact of the allocation of radio resources and the mobile nature of the subscribers and performs procedures required for location registration and hand-over of served MSs.

Furthermore, the MSC 5 is connected to a Home Location Register (HLR) 6, which is a data base in charge of the management of mobile subscribers. The PLMN may contain one or several HLRs 6, depending on the number of mobile subscribers, the capacity of the equipment and the organization of the network. All subscription data is stored in the HLR 6. The main information stored in the HLR 6 concerns the location of each MS in order to be able to route calls to the mobile subscribers managed by each HLR 6. All management interventions occur on this data base. In particular, the HLR 6 contains information such as identification numbers attached to each mobile subscription, a location information, communication service subscription information, service restrictions (e.g. roaming limitations), and supplementary service information including parameters attached to these services.

Additionally, the MSC 5 is connected to a Visitor Location Register (VLR) 7 which is in charge of this MSC area. In the present case, an MS 2 appears in the location area of the VLR 7. Thus, the VLR 7 starts an allocation updating procedure, and the MSC 5 notices this registration and transfers the identity of the location area where the MS 2 is situated to the VLR 7. The VLR 7 stores information needed to handle the calls set up or received by the MSs registered in its data base, wherein the VLR 7 may sometimes require additional information from the HLR 6. In particular, the VLR 7 contains the identification numbers of the registered mobile subscribers, a temporary mobile station identity (TMSI), a location area where a corresponding MS is registered, and the supplementary service parameters.

As shown in FIG. 1, the MS 2 comprises an external or integrated user interface 1 which may comprise a usual keypad and display, a voice connection or a video connection to an information desk, a display with an interactive graphical menu or an interactive map. The user interface 1 can be used for accessing a local service provided by local cellular network 8.

The local cellular network 8 is mainly used for internal communication of an organizer of a specific local service provided within the limited coverage of the local cellular network 8. In particular, the local service may be an information and location service provided in a large-area supermarket, hardware store, car dealer area, and the like, and relating to a call for assistance, for finding the right product, or for advertising. Alternatively, the information and location service may be provided at an airport and may be arranged for providing an information about the location or for finding the right airport gate. Furthermore, the local service may be provided in international fairs, as a source of information about the location, as a call for service (catering, office services, etc.), or for issuing fault messages (no electricity, lost goods, etc.).

Alternatively, the local service may be a wireless PBX (Private Branch Exchange) provided in hotels or offices, an online voting, polling provided at political party conventions, or gambling service at horse races, or a service for using a visitor LAN (Bluetooth, etc.) for printing facsimile, game or movie applications.

According to the preferred embodiment, the local cellular network 8 is arranged to provide a temporary visitor access in addition to the normal access which is allowed only for certain subscribers included in a database of the HLR 6, VLR 7 or any other corresponding network register. The temporary visitor access is provided in order to enable a visitor having a mobile terminal to access the local cellular network 8. Additionally, "mobile" terminals may be provided at predetermined locations of the coverage area of the local cellular network, so as to enable those visitors having no mobile telephone to perform a visitor access in order to get one of the above-specified pieces of information.

The temporary access is provided by defining a visitor access requirement based on at least one visitor criterion which has to be met in order to get an access to the local cellular network 8. When a connection or call attempt is received by the VLR 7 from the MS 2 via the MSC 5, the VLR 7 is arranged to analyze the received call attempt with respect to the visitor criterion, and controls the MSC 5 so as to establish a connection to the local service, if the received call attempt meets the visitor access requirement.

As an example, the temporary access could be realized by allocating certain telephone numbers within the network for "visitor connections". Thus, when a call attempt is received by the VLR 7 from the MS 2, the VLR 7 analyzes whether the dialled number belongs to the set of predetermined visitor numbers. If so, the visitor connection will be completed. In case only one visitor number is used, the connection number could be released for further use. In case a plurality of numbers is used, parallel visitor connections could be opened.

As a further example, the visitor access could be based on the location information of the MS 2, stored in the VLR 7. When a call attempt is received by the VLR 7 from the MS 2, the VLR 7 analyzes the location information relating to the MS 2 and controls the MSC 5 so as to complete the connection, if the location information indicates a location of the MS 2 within a predetermined area covered by the local cellular network 8.

Besides the above visitor criteria, the visitor access can be based on criteria such as the time of the received call attempt, and/or the identity of the MS 2, or any combination of the above criteria.

The visitor access based on the visitor access requirement may be established in such a way that a limited number of services, i.e. a subset of all possible services available in the local area network 8 is provided to a visitor. The visitor services can be decided by the operator or service provider of the local cellular network. Additionally, the charging rate can be determined by the operator based on the identification number stored in the HLR 6 or the VLR 7. Thus, good customers may have a cheap or even free service. Moreover, special services could be priced higher.

Figure 2:
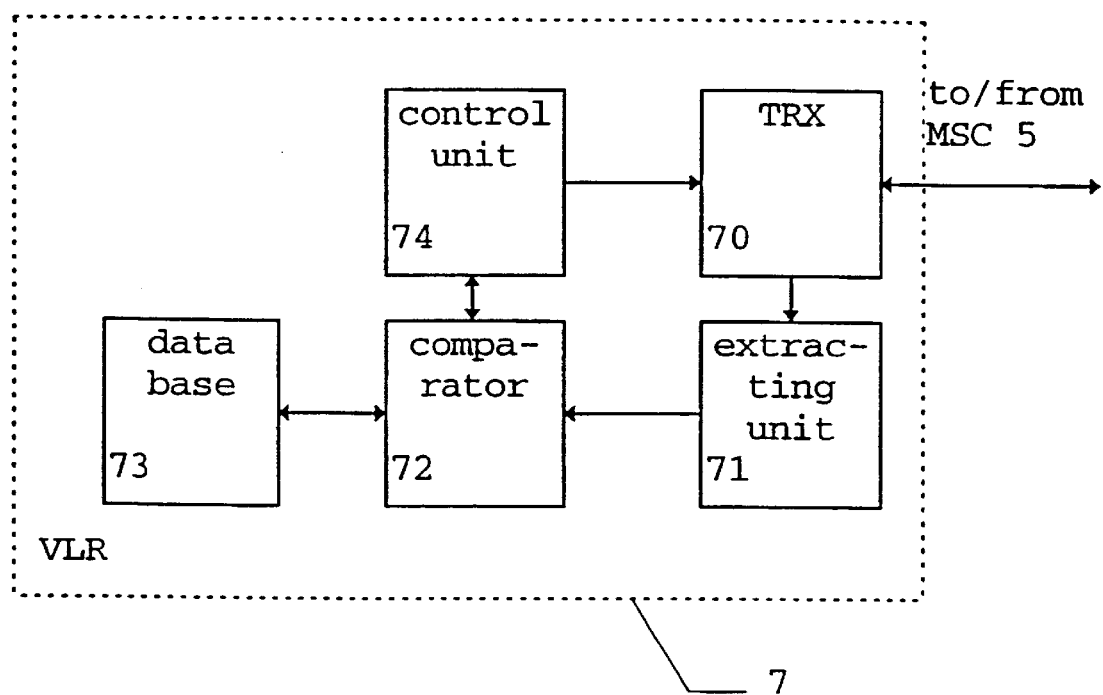
FIG. 2 shows a block diagram of a visitor location register according to the preferred embodiment of the present invention.
Figure 3:
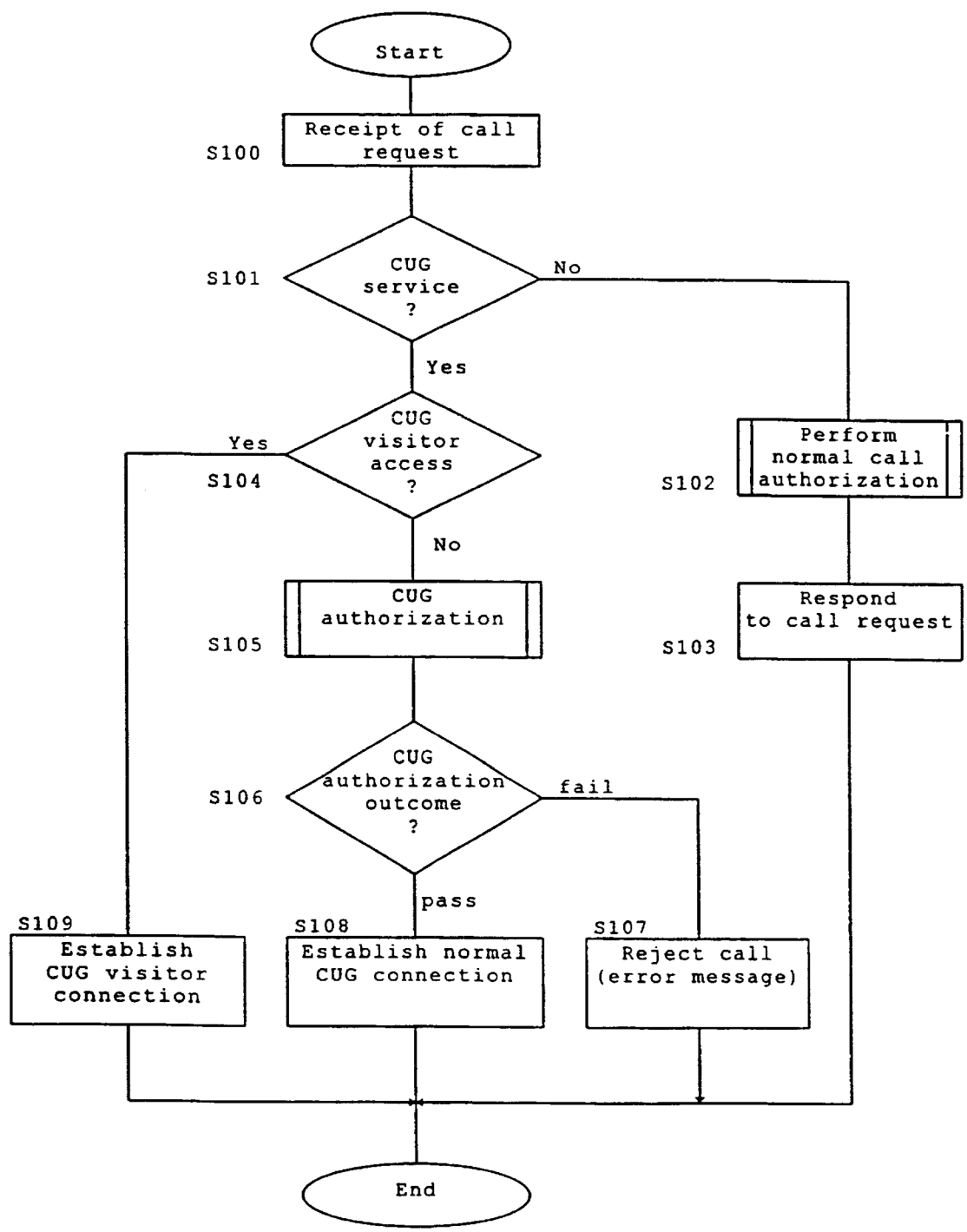
FIG. 3 shows a flow diagram of a procedure for establishing a connection to a local service, according to the preferred embodiment of the present invention.

FIG. 2 shows a block diagram of a network register such as the VLR 7. The VLR 7 comprises a transceiver (TRX) 70 having a transmitting and receiving function for performing signaling with the MSC 5. Furthermore, the VLR 7 comprises an extracting unit 71 for extracting a required visitor access information relating to the visitor criterion/criteria underlying the visitor access requirement. According to the above example, the visitor access criterion may be the dialled telephone number or a subscriber identification used for deriving a location information of the subscriber from which a received call attempt to the local service has been received. The predetermined allocated visitor numbers or the predetermined location area are stored in a database 73 provided in the VLR 7. The analysis of the visitor access requirement is based on a comparison performed in a comparator 72.

In particular, the extracted visitor information, e.g. the dialled number or the derived subscriber location (or a combination of these), is compared with the visitor criterion of the visitor access requirement, e.g. the predetermined allocated visitor numbers or the predetermined location area. The comparison result is supplied to a control unit 74 connected to the TRX 70, so as to perform a control signaling to the MSC 5 in order to establish a visitor connection, when the comparison result indicates that the visitor access requirement is met by the received call attempt.

In the following, the control procedure performed in the VLR 7 is described based on the CUG defined as a supplementary service in the GSM specifications.

In step S100, a call request is received by the MSC 5 and passed to the VLR 7. The TRX 70 of the VLR 7 receives the call request and supplies it to the extracting unit 71 which checks whether a CUG service is requested (step S101). If not, the control unit 74 performs a normal call authorization based on the information provided by the call request and the subscription information stored in the VLR 7. Thus, no CUG information is passed to the MSC 5 and the call is established normally and transferred to the called party (step S102). Then, a usual response to the call request is issued to the calling subscriber (step S 103).

If a CUG service is determined in step S101 based e.g. on the dialled number, the extracting unit 71 extracts the visitor information and supplies it to the comparator 72 in order to analyze whether the CUG visitor access requirement is met (step S104). If the visitor access requirement is not met (e.g. the dialled number is not a visitor number, or the calling party is not located in the visitor location area), a CUG authorization procedure is performed (step S105). The CUG authorization is determined based on the CUG supplementary service information stored in the VLR 7. In step S106, the CUG authorization outcome is checked and the call is rejected with a corresponding error message (step S107), if the authorization has failed. In case the call request has passed the CUG authorization, a normal CUG connection is established in step S108.

If it is determined in step S104 that the CUG visitor access requirement is met, a CUG visitor connection is established in step S109. As already mentioned, the CUG visitor connection may have a special charging rate and may be limited to a predetermined number of services. The corresponding information is signaled to the MSC 5, which establishes the CUG visitor connection.

Accordingly, the CUG service can be diversified to any visitor, such that a temporary access can be provided to non-subscribers of the CUG supplementary service.

It is to be pointed out that the described establishment of the visitor connection can be performed in any local area having a limited coverage, e.g. one or a plurality of predetermined cells of a cellular network, or the like, and is not restricted to a local cellular network such as the CUG, WIO, LAN or WLAN supplementary services. Furthermore, the analysis of the visitor access requirement can be performed in any network element, e.g. the MSC 5, the HLR 6 or any other network register. The functionality suggested by the present invention may also be implemented in connection with IN (Intelligent Network) or with WAP (Wireless Application Protocol). Moreover, any information suitable for distinguishing potential subscribers can be used for deciding on the visitor access {e.g. location of the subscriber, terminal identity (e.g. access only accepted for those subscribers having terminals rented at a corresponding public place), time of the call attempt, and the like}. The above description of the preferred embodiment and the accompanying drawings are only intended to illustrate the present invention. The preferred embodiment of the invention may thus vary within the scope of the attached claims.

In summary, the present invention relates to a method and network element for establishing a connection to a local service, wherein a local cellular network having a limited coverage is provided, which may be temporarily accessed based on a visitor access requirement. A call attempt is analyzed with respect to the visitor access requirement and the connection to the local service is established if the received call attempt meets the visitor access requirement. Thus, a temporary access can be enabled without a subscription to the supplementary service of the local cellular network. Thereby, any visitor having a mobile telephone may access the local service.

Having described the invention, what is claimed is:

1. A method for establishing a connection to a local service, comprising the steps of:
   a) providing a local area having a limited coverage;
   b) defining a visitor access requirement based on at least one visitor criterion for a temporary access to said local area;
   c) analyzing a received connection attempt with respect to said visitor access requirement; and
   d) establishing said connection, if said received connection attempt meets said visitor access requirement,
   wherein said at least one visitor criterion comprises a visitor dialing number allocated for visitor connections within said local area,
   wherein a limited number of services, that is a subset of all services available in the local area network for service personnel and others, is available to said established connection for a visitor,
   wherein the analyzing step includes comparing a dialed number, of the received connection, with the visitor dialing number,
   wherein the at least one visitor criterion further comprises a predetermined location area of a terminal generating the received connection attempt, and
   wherein the limited number of services includes an information service for providing information about the location area.

2. A method according to claim 1, wherein said local area is a CUG, WIO, LAN or WLAN.

3. A method according to claim 1, wherein said at least one visitor criterion comprises a predetermined location of a terminal generating said received connection attempt, the time of said received connection attempt, and/or an identity of said terminal generating said received connection attempt, or a combination of these.

4. A method according to claim 3, wherein said terminal generating said received connection attempt is a mobile terminal.

5. A method according to claim 3, wherein at least one predetermined visitor dialling number is allocated for visitor connections within said local area.

6. A method according to claim 5, wherein said analyzation step comprises comparing a dialled number with said at least one predetermined visitor dialling number.

7. A method according to claim 5, wherein said at least one predetermined visitor dialling number is released for further use after said connection has been completed.

8. A method according to claim 1, wherein a plurality of parallel connections are established when a plurality of connection attempts meeting said visitor access requirement have been received.

9. A method according to claim 1, wherein the routing of a call is determined based on an information derived from said connection attempt.

10. A method according to claim 1, wherein the routing of a call is determined based on an information derived from said connection attempt.

11. A method according to claim 1, wherein said local service is an information or location service, a wireless private branch exchange service, an online voting, polling or gambling service, or a visitor LAN service.

12. A network element for establishing a connection to a local service, comprising:
   a) receiving means (7) for receiving a connection attempt from a terminal (2);
   b) storing means (73) for storing at least one visitor criterion determining a visitor access requirement for a temporary access to a local area (8) providing said local service;
   c) analyzing means (71, 72) for analyzing said received connection attempt with respect to said visitor access requirement; and
   d) control means (74) for performing a control so as to initiate a connection establishment, if said received connection attempt meets said visitor access requirement,
   wherein said at least one visitor criterion comprises a visitor dialing number allocated for visitor connections within said local area,
   wherein a limited number of services, that is a subset of all services available in the local area network for service personnel and others, is available to said established connection for a visitor,
   wherein the analyzing means is for comparing a dialed number, of the received connection, with the visitor dialing number,
   wherein the at least one visitor criterion further comprises a predetermined location area of a terminal generating the received connection attempt, and
   wherein the limited number of services includes an information service for providing information about the location area.

13. A network element according to claim 12, wherein said at least one visitor criterion comprises a visitor dialling number, a predetermined location of said terminal from which said connection attempt has been received, the time of said received connection attempt, and/or an identity of said terminal from which said connection attempt has been received, or a combination of these.

14. A network element according to claim 12, wherein said analyzing means (71, 72) comprises an extracting means (71) for extracting an information relating to said at least one visitor criterion from said received connection attempt, and a comparing means (72) for comparing said extracted information with said at least one visitor criterion stored in said storing means (73), wherein said control means (74) performs said control in response to the comparison result of said comparison means (72).

15. A network element according to claim 12, wherein said network element is a visitor location register (7) serving said local area (8).

16. A network element according to claim 12, wherein a user interface (1) of said terminal (2) comprises one or more of the following: a voice connection, a video connection to an information desk, an interactive graphical menu, or an interactive map.

17. A network element according to claim 12, wherein said terminal is a mobile terminal (2).

18. The method of claim 1,
   wherein said local area is normally a closed network.

* * * * *

UNITED STATES PATENT AND TRADEMARK OFFICE
CERTIFICATE OF CORRECTION

PATENT NO. : 6,807,417 B2
DATED : October 19, 2004
INVENTOR(S) : Sallinen et al.

It is certified that error appears in the above-identified patent and that said Letters Patent is hereby corrected as shown below:

Column 7.
Line 41, please change "on" to -- one --.

Signed and Sealed this

Fourth Day of January, 2005

JON W. DUDAS
*Director of the United States Patent and Trademark Office*